(12) United States Patent
Tung

(10) Patent No.: US 11,644,686 B2
(45) Date of Patent: May 9, 2023

(54) EYEGLASS LENS REPLACEMENT ASSEMBLY

(71) Applicant: Yi-Ping Tung, Tainan (TW)

(72) Inventor: Yi-Ping Tung, Tainan (TW)

( * ) Notice: Subject to any disclaimer, the term of this patent is extended or adjusted under 35 U.S.C. 154(b) by 261 days.

(21) Appl. No.: 17/179,934

(22) Filed: Feb. 19, 2021

(65) Prior Publication Data
US 2022/0269103 A1 Aug. 25, 2022

(51) Int. Cl.
*G02C 1/02* (2006.01)
*G02C 7/02* (2006.01)

(52) U.S. Cl.
CPC .............. *G02C 1/02* (2013.01); *G02C 7/02* (2013.01); *G02C 2200/08* (2013.01)

(58) Field of Classification Search
CPC ........ G02C 1/02; G02C 7/02; G02C 2200/08; G02C 1/04; G02C 2200/06; G02C 5/02
USPC .................................................. 351/41, 103
See application file for complete search history.

(56) References Cited

U.S. PATENT DOCUMENTS

| | | | | |
|---|---|---|---|---|
| 4,951,322 A | * | 8/1990 | Lin | G02C 5/02 351/44 |
| 5,576,775 A | * | 11/1996 | Bolle | G02C 11/08 2/436 |
| 5,903,331 A | * | 5/1999 | Lin | G02C 1/04 351/105 |
| 7,347,545 B1 | * | 3/2008 | Jannard | G02C 1/04 351/86 |

\* cited by examiner

*Primary Examiner* — Tuyen Tra
(74) *Attorney, Agent, or Firm* — Rosenberg, Klein & Lee

(57) ABSTRACT

An eyeglass lens replacement assembly is revealed. A frame includes a lens insertion slot disposed on a lower edge and a mounting indentation communicating with the lens insertion slot. A bevel is formed on each of two sides of the front end of the mounting indentation. A movable mounting member is mounted in the mounting indentation and has two mounting pins and a concave part formed on a middle part of the mounting pin. The upper edge of a lens is inserted into the lens insertion slot while the lens includes a mounting slot corresponding to the mounting pins and two protruding portions corresponding to the concave parts of the mounting pins. The movable mounting member can turn back and remain positioned by the bevels of the mounting indentation combined with recovery elasticity of the two mounting pins of the movable mounting member. No additional elastic members are required.

2 Claims, 11 Drawing Sheets

EYEGLASS LENS REPLACEMENT ASSEMBLY

BACKGROUND OF THE INVENTION

Field of the Invention

The present invention relates to an eyeglass lens replacement assembly which is not only easier and more convenient to be assembled and used, but also having extended service life and no elastic fatigue.

Description of Related Art

Eyeglasses are divided into various types such as optical glasses, sunglasses, sports glasses, night vision glasses, etc. according to their functions. Users can select glasses according to their personal needs at different time so that most of people have several pairs of glasses. For example, the sport glasses used in the daytime protects users from ultraviolet radiation while the sport glasses should allow more light to pass through due to insufficient light at night. However, to buy more eyeglasses costs a lot more money and more space is needed for eyeglasses storage.

The basic structure of the eyeglasses includes a frame which holds at least one lens. After the lens being mounted into a lens assembly hole of the frame, threaded fasteners are inserted into threaded holes of the frame beside the lens assembly hole and threaded into the frame for clamping and fixing the lens inside the lens assembly hole of the frame. Then temples are pivotally connected to two sides of the frame. The assembly of the eyeglasses is completed. Although the lens can be clamped and fixed inside the lens assembly hole by the threaded fasteners, threaded fastener driving tools are required to tighten or release the threaded fasteners while mounting or removing the lens relative to the lens assembly hole. Thus the assembly or disassembly of the lens is inconvenient once users don't have the right tool on hand.

Some people in the business have developed eyeglasses capable of being assembled or disassembled by being pressed. The eyeglasses include a mounting member for holding and positioning lens. Elastic members are used to position the mounting member. While the mounting member is pressed, the lens is capable of being assembled or disassembled. Once there is no force applied to the mounting member, the mounting member turns back to position the lens by elasticity of the elastic members.

However, while in use, the elastic member used to abut against and position the mounting member has quite small volume so that both manufacturing and assembly are inconvenient. Moreover, the elastic member is easy to have elastic fatigue after long term use. Thus the elastic member can't abut against the mounting member to the position required smoothly so that the lens may fall out of the eyeglasses and the service life is reduced. Once the elastic fatigue occurs, the replacement of the elastic member is also quite inconvenient due to the small volume.

Thus there is room for improvement and there is a need to provide a novel eyeglass lens replacement assembly which not only addresses the above issues but also becomes more convenient to use.

SUMMARY OF THE INVENTION

Therefore it is a primary object of the present invention to provide an eyeglass lens replacement assembly in which a movable mounting member can turn back and remain positioned by bevels of a mounting indentation of a frame in combination with recovery elasticity of two mounting pins of the movable mounting member and no additional elastic members are required. Thereby the whole assembly process is easier and more convenient and there are no elastic fatigue issues. The service life of the eyeglass lens replacement assembly is extended and the eyeglass lens replacement assembly is more convenient to use.

In order to achieve the above object, an eyeglass lens replacement assembly according to the present invention includes a frame, a movable mounting member and a lens.

A lens insertion slot is disposed on a lower edge of the frame while a mounting indentation is formed on a middle part of a surface of a rear side of the frame and communicating with the lens insertion slot. A limit recess is arranged at a top end of the mounting indentation and a bevel is formed on each of two sides of the front end of the mounting indentation.

The movable mounting member is mounted in the mounting indentation of the frame and composed of a limit convex part and two mounting pins. The limit convex part is projecting toward the limit recess of the mounting indentation while the two mounting pins are corresponding to each other and projecting toward the mounting indentation. The movable mounting member is firmly mounted in the mounting indentation by the limit convex part locked and positioned in the limit recess. A concave part is formed on a middle part of the mounting pin.

An upper edge of the lens is inserted into the lens insertion slot of the frame while a mounting slot is formed on the upper edge of the lens and corresponding to the mounting pins of the movable mounting member. Two protruding portions are located at two sides of an open end of the mounting slot and corresponding to the concave parts of the two mounting pins correspondingly.

Preferably, a guiding ramp is formed on the mounting pin and corresponding to a lower edge of the concave part.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions and with reference to the related figures and numbers therein.

Refer to FIG. 1-FIG. 4, an eyeglass lens replacement assembly according to the present invention mainly includes a frame 1, a movable mounting member 2 and a lens 3.

Figure 1:
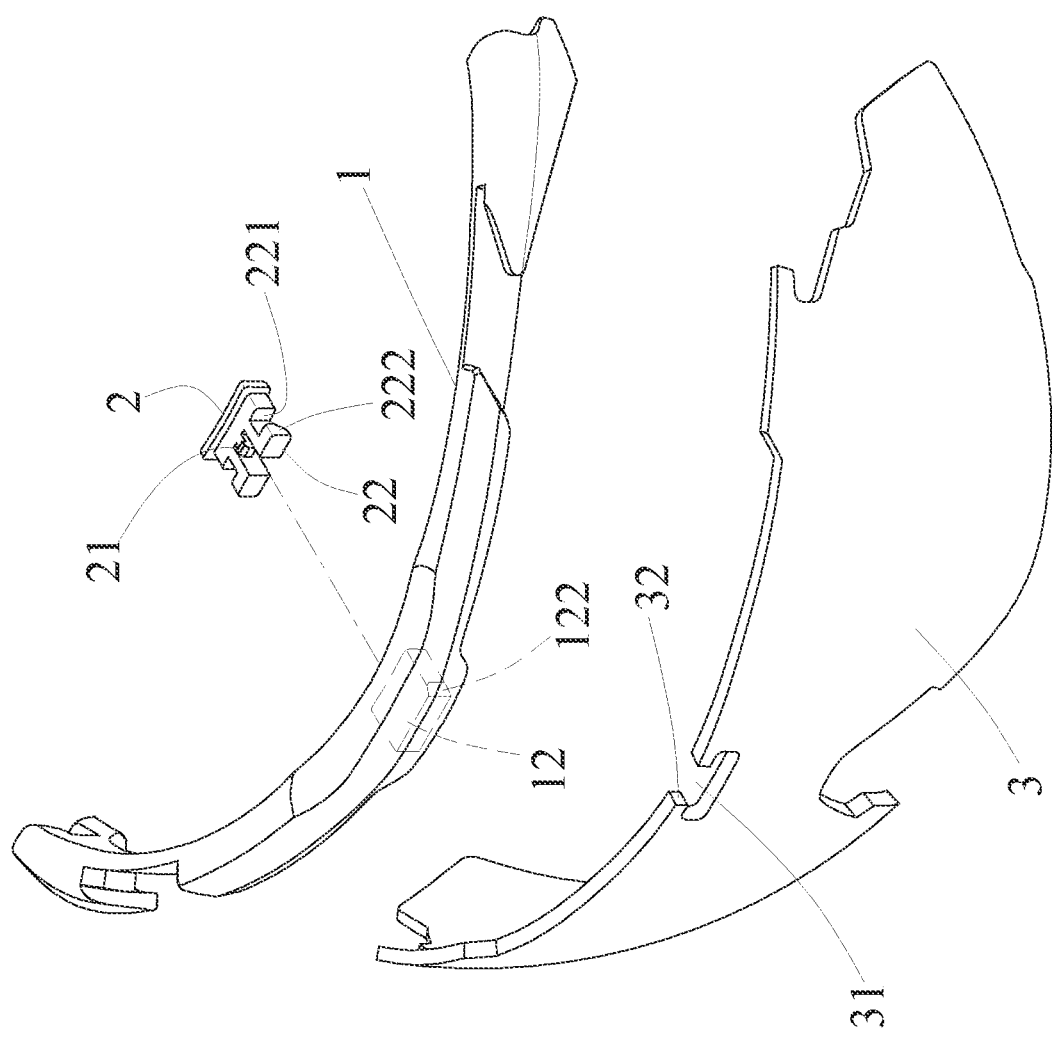
FIG. 1 is an explosive view of an embodiment according to the present invention.
Figure 2:
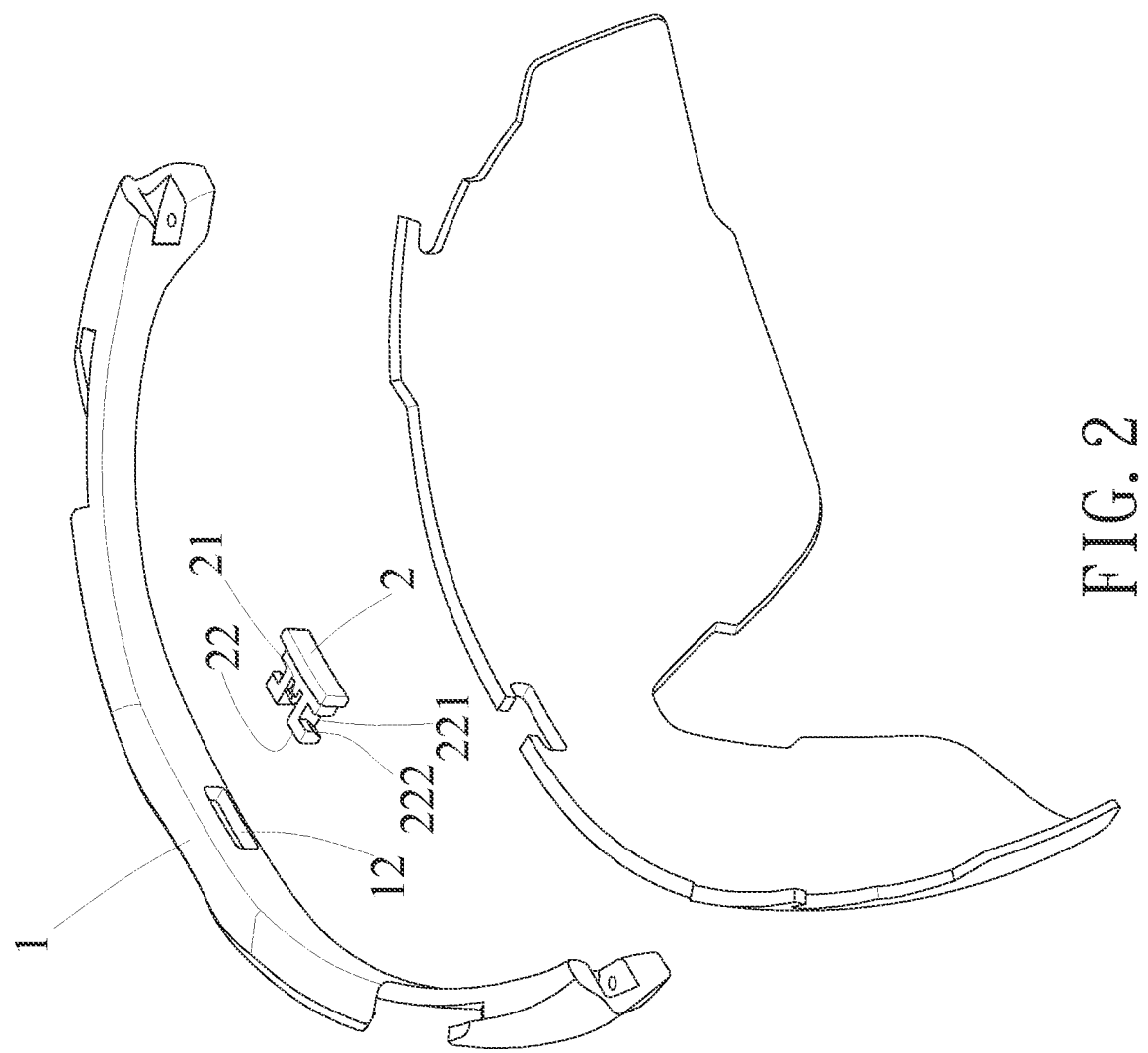
FIG. 2 is an explosive view of an embodiment viewed from another angle according to the present invention.
Figure 3:
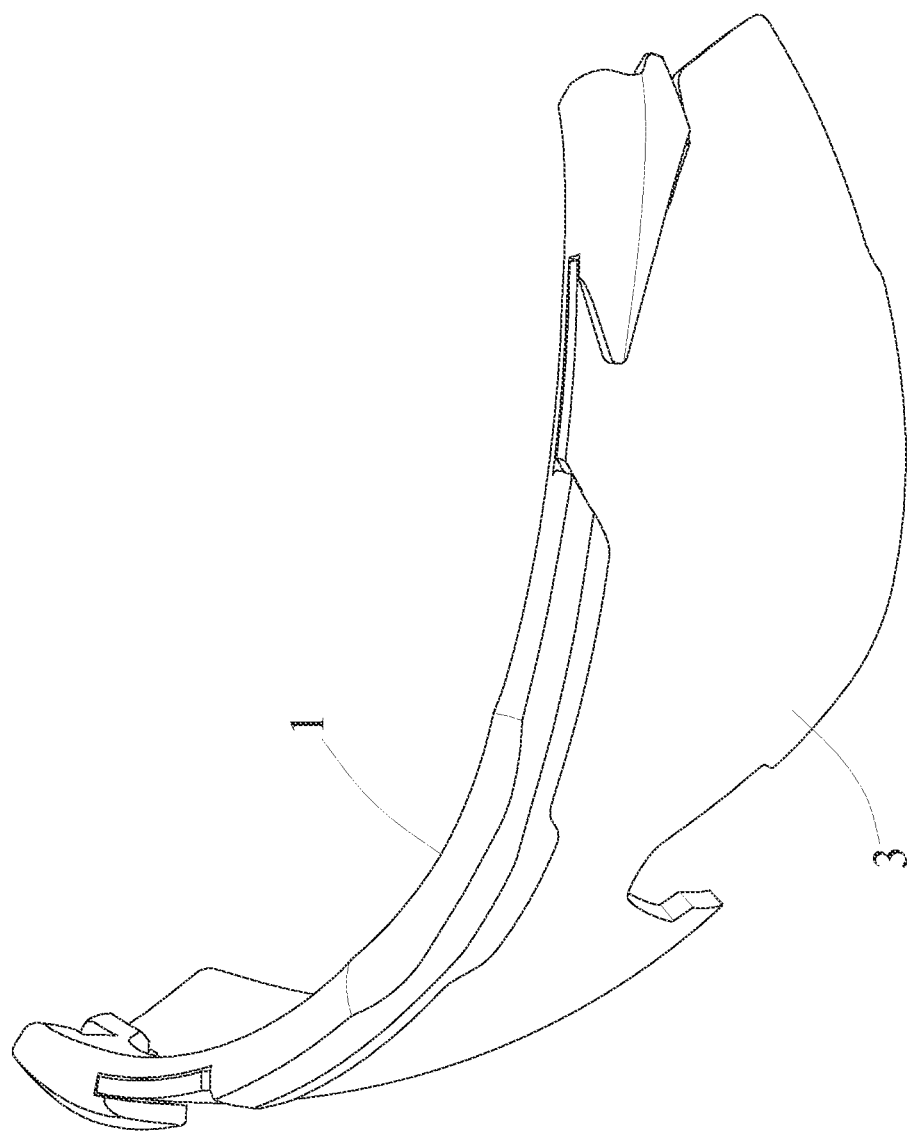
FIG. 3 is a perspective view of an embodiment according to the present invention.
Figure 4:
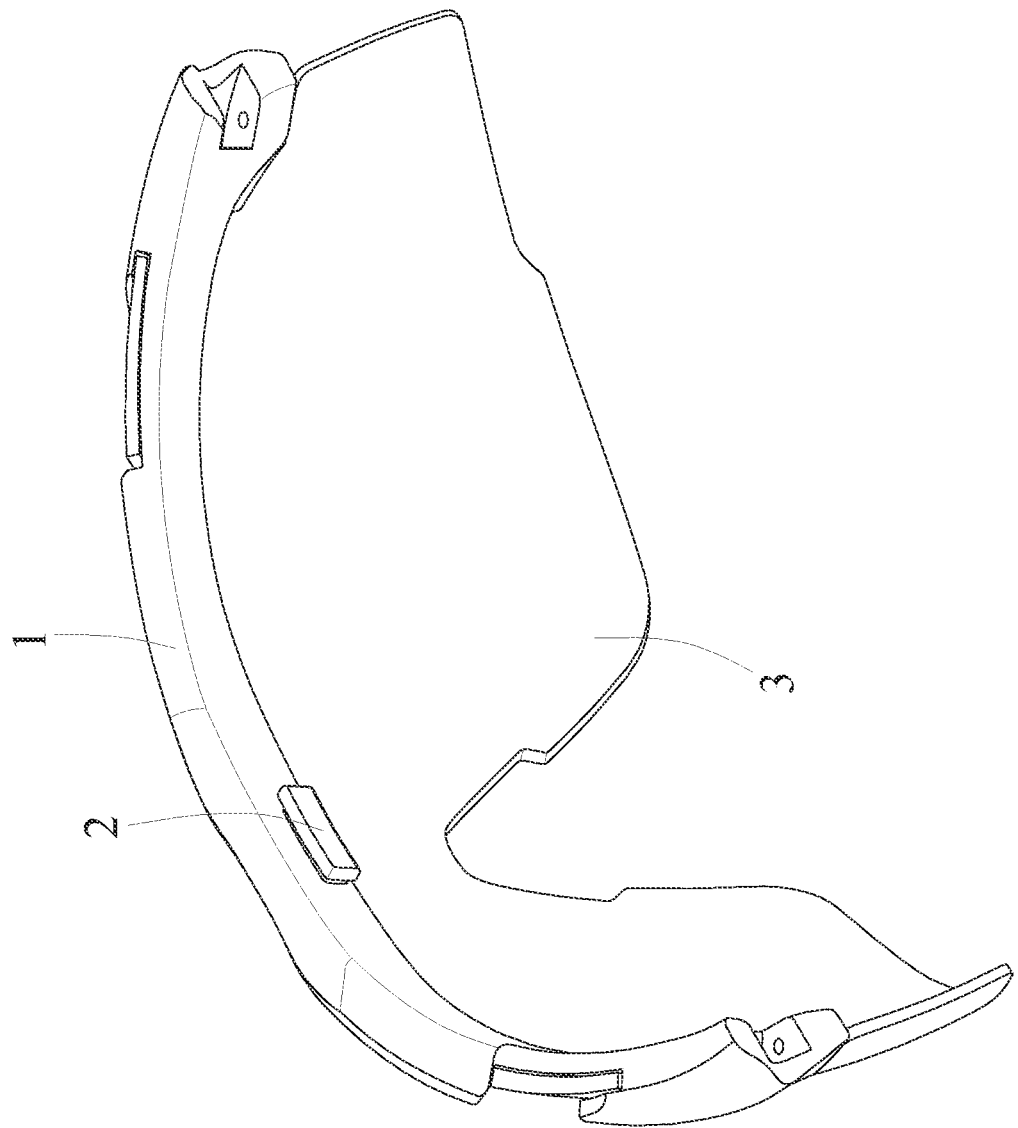
FIG. 4 is a perspective view of an embodiment viewed from another angle according to the present invention.
Figure 5:
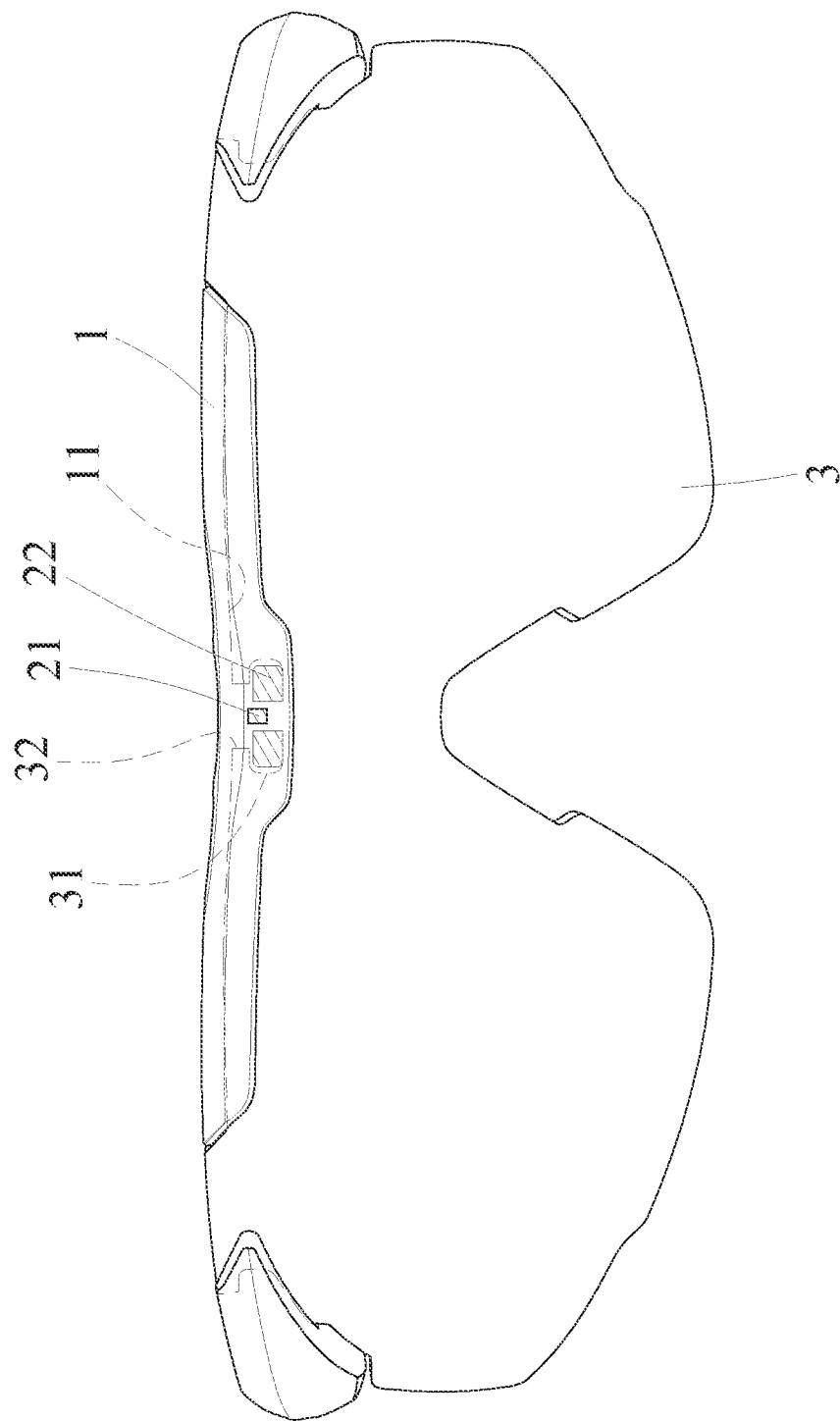
FIG. 5 is a front view of a section of an embodiment according to the present invention.
Figure 6:
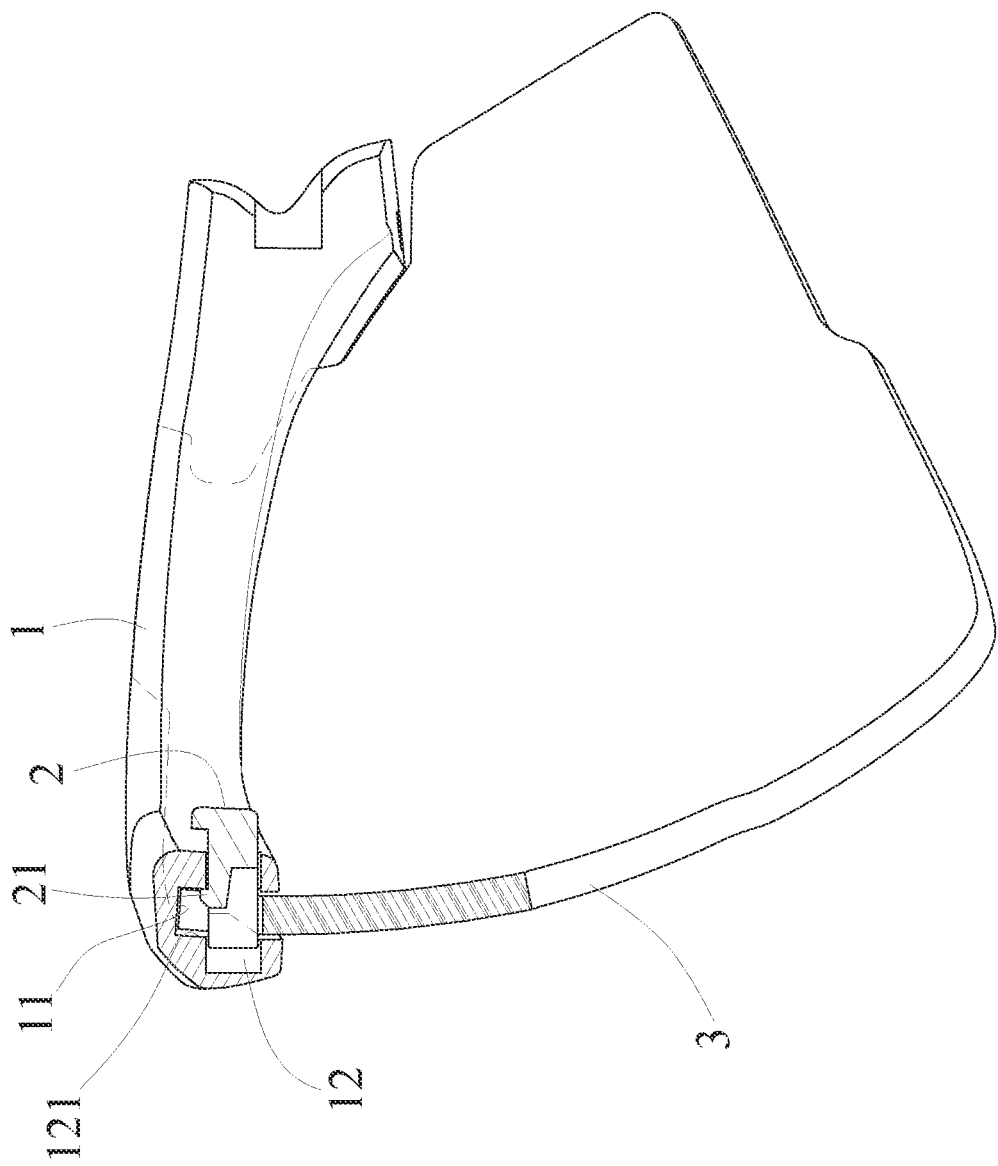
FIG. 6 is a side view of a section of an embodiment according to the present invention.

The frame 1 consists of a lens insertion slot 11 disposed on a lower edge of the frame 1 and a mounting indentation 12 which is formed on a middle part of a surface of a rear side of the frame 1 and communicating with the lens insertion slot 11, as shown in FIG. 2, FIG. 5 and FIG. 6. A limit recess 121 is arranged at a top end of the mounting indentation 12 while a bevel 122 is formed on each of two sides of the front end of the mounting indentation 12, as shown in FIG. 1 and FIG. 6.

Refer to FIG. 1, FIG. 2 and FIG. 5, the movable mounting member 2 is mounted in the mounting indentation 12 of the frame 1 and composed of a limit convex part 21 projecting toward the limit recess 121 of the mounting indentation 12 and two mounting pins 22 corresponding to each other and projecting toward the mounting indentation 12. The movable mounting member 2 will not be separated from the mounting indentation 12 once being connected to each other due to the limit convex part 21 locked and positioned in the limit recess 121. A concave part 221 is formed on a middle part of the mounting pin 22 while a guiding ramp 222 is formed on the mounting pin 22 and corresponding to a lower edge of the concave part 221.

An upper edge of the lens 3 is inserted into the lens insertion slot 11 of the frame 1 while the lens 3 includes a mounting slot 31 and two protruding portions 32. The mounting slot 31 is formed on the upper edge of the lens 3 and corresponding to the mounting pins 22 of the movable mounting member 2 while the protruding portion 32 is located on each of two sides of an open end of the mounting slot 31 and corresponding to the concave part 221 of the mounting pin 22.

Figure 7:
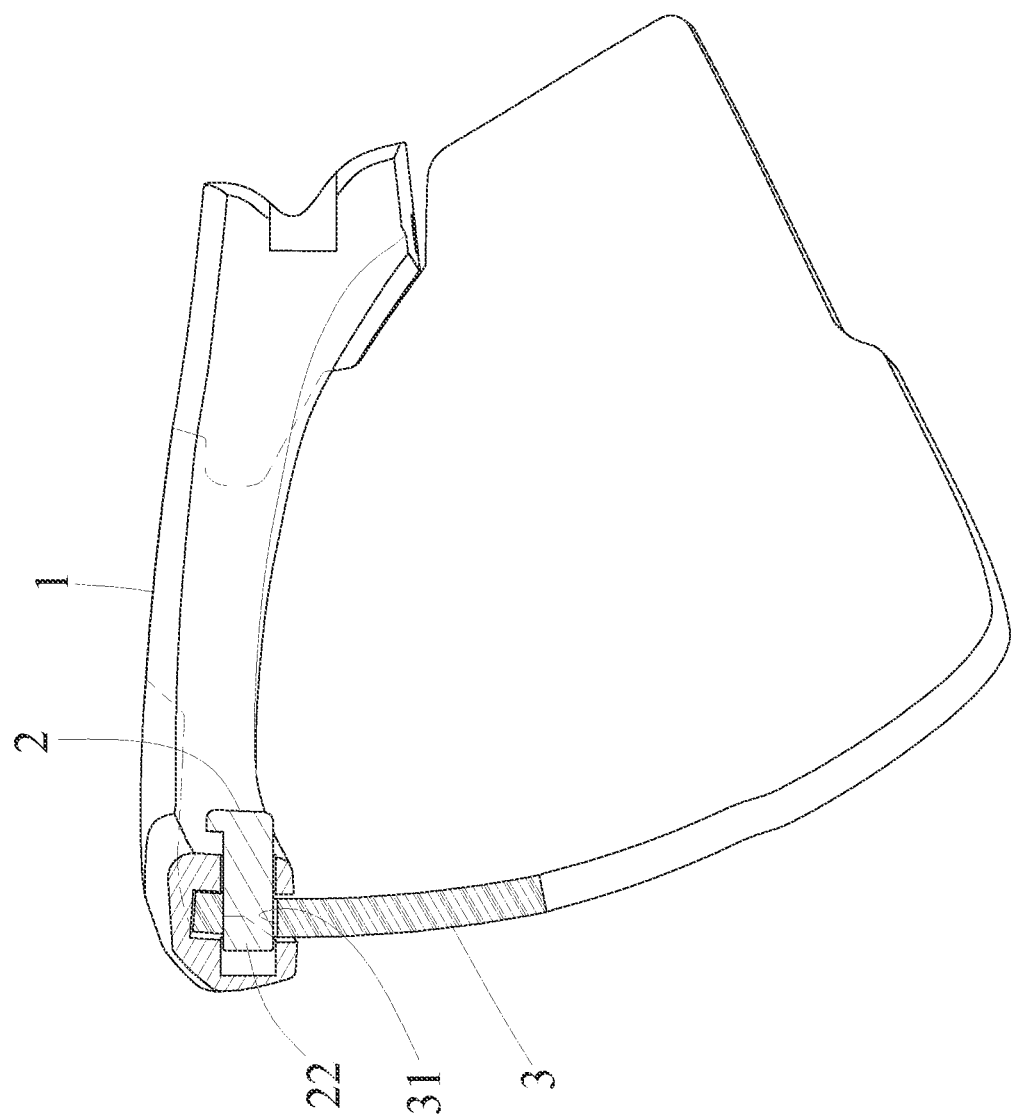
FIG. 7 is a side view of a section of an embodiment according to the present invention.
Figure 8:
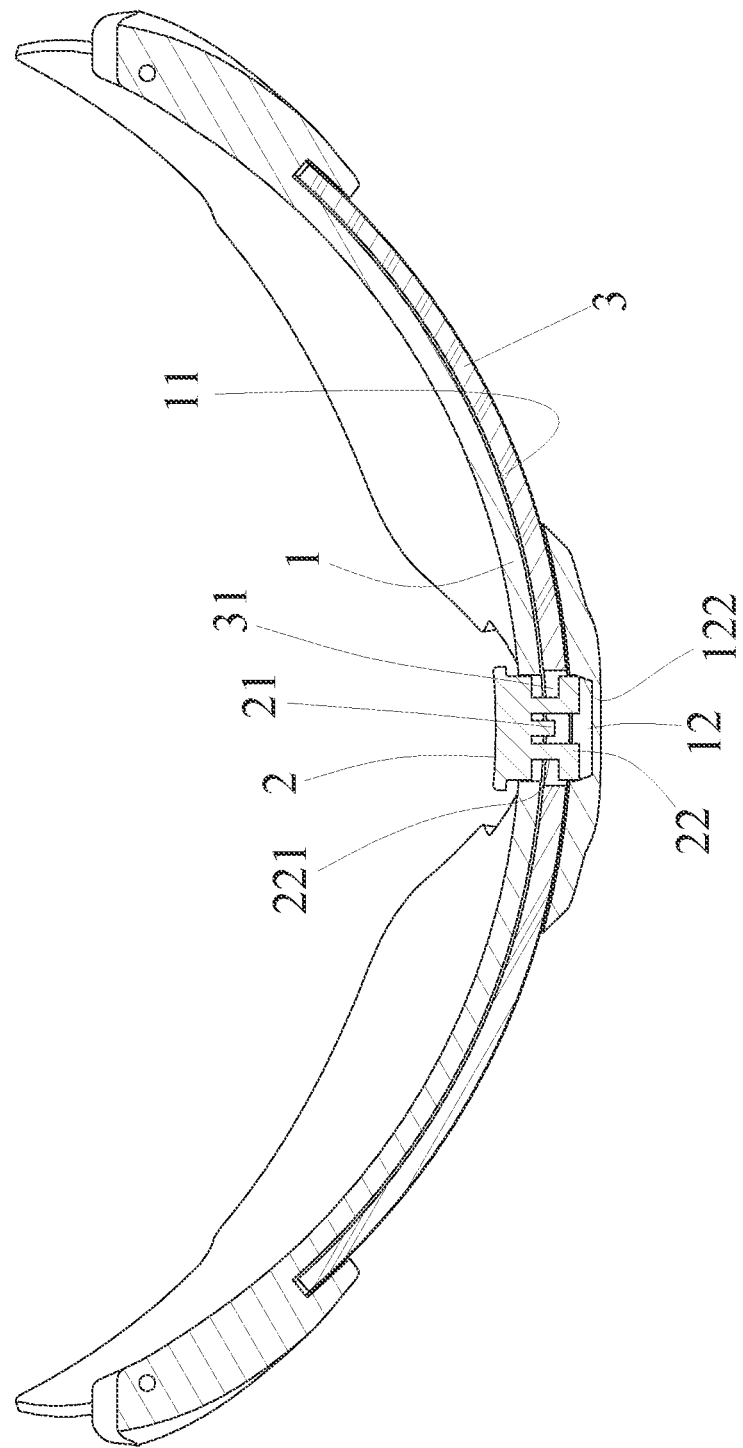
FIG. 8 is a top view of a section of an embodiment according to the present invention.

While being assembled, the upper edge of the lens 3 is inserted into the lens insertion slot 11 of the frame 1 and the lens 3 is connected to and positioned by the lens insertion slot 11 of the frame 1 firmly by the two mounting pins 22 of the movable mounting member 2 being mounted and positioned in the mounting slot 31 of the lens 3, as shown in FIG. 5, FIG. 7 and FIG. 8.

Figure 9:
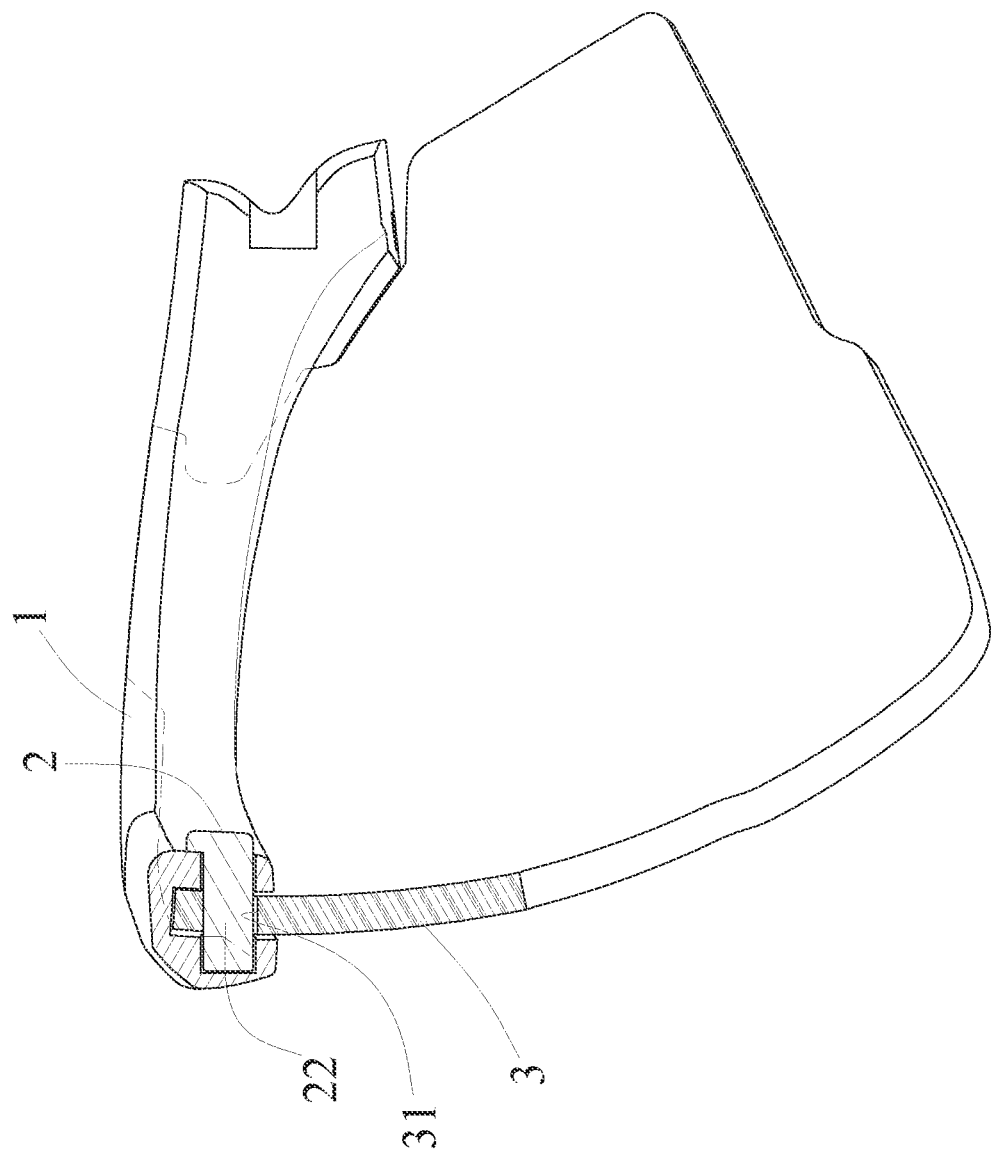
FIG. 9 is a side view of a section of an embodiment showing a removable mounting member being pressed according to the present invention.
Figure 10:
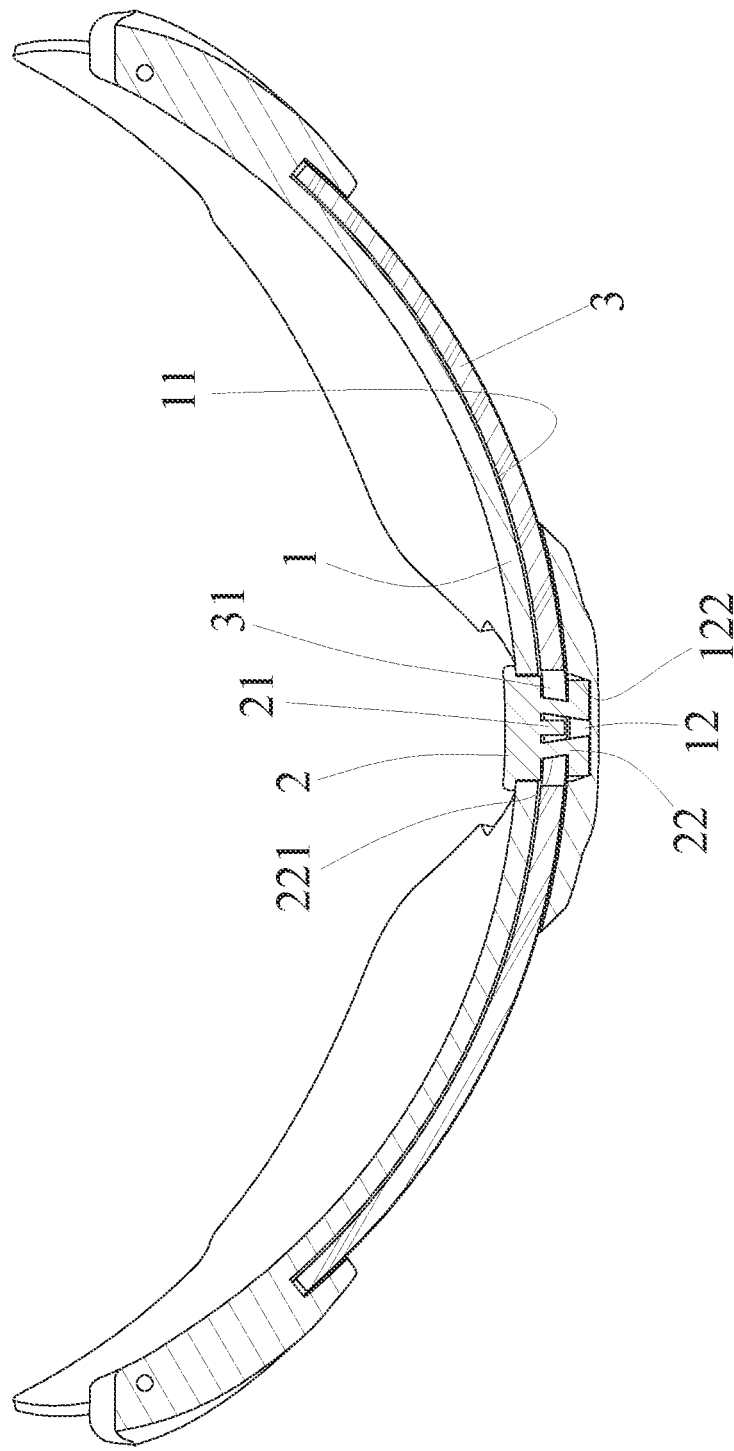
FIG. 10 is a top view of a section of an embodiment showing a removable mounting member being pressed according to the present invention.
Figure 11:
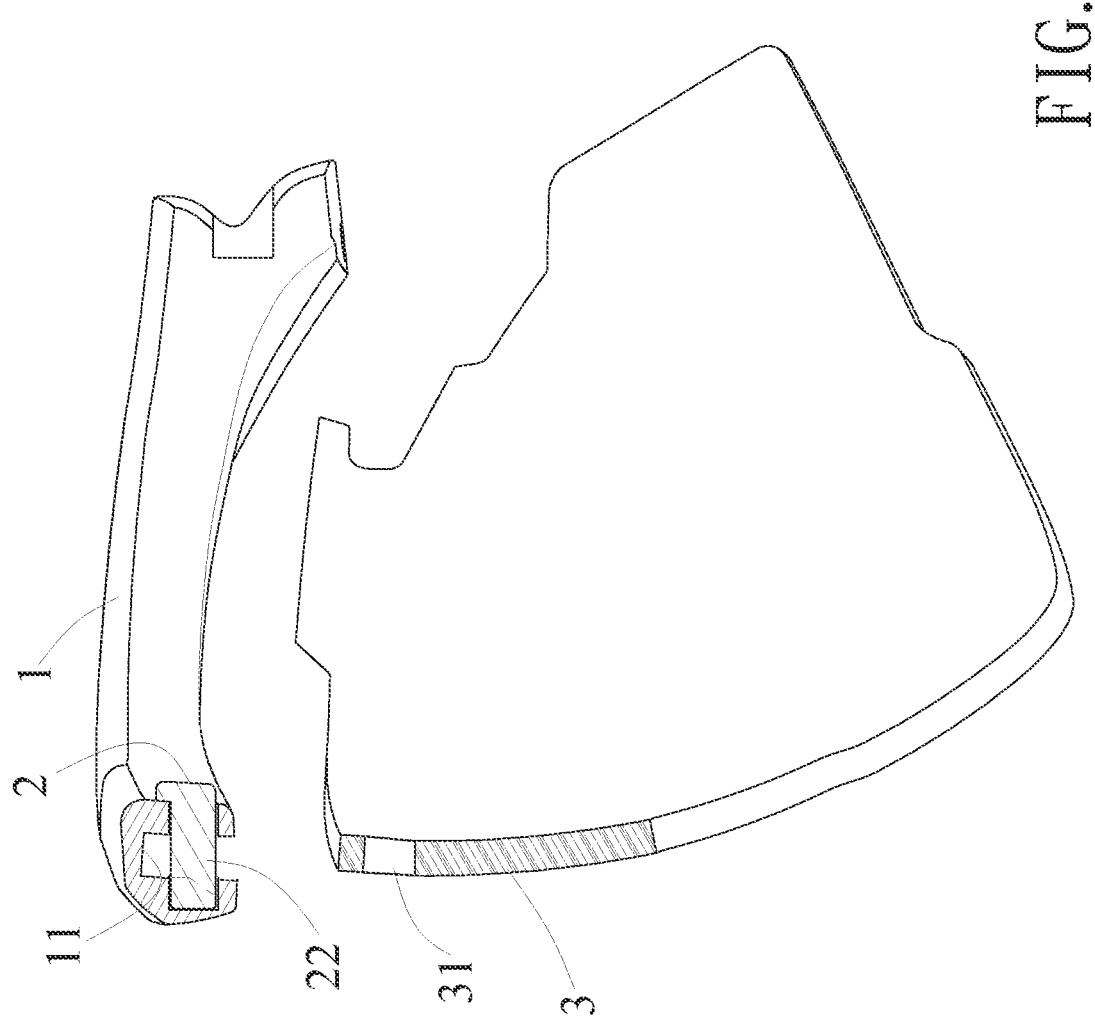
FIG. 11 is a side view of a section of an embodiment showing a lens being released from a frame according to the present invention.

Refer to FIG. 9 and FIG. 10, while users intend to remove or replace the lens 3, the movable mounting member 2 is pressed toward the mounting indentation 12 of the frame 1 so that the bevel 122 on the side of the front end of the mounting indentation 12 abuts against the front end of the mounting pin 22 of the movable mounting member 2 so that the front end of each mounting pins 22 is deformed and moved toward the middle of the mounting member 2. Then the protruding portion 32 on each of the two sides of the open end of the mounting slot 31 of the lens 3 is released from the concave part 221 of the mounting pin 22 and the lens 3 is removed from the lens insertion slot 11 of the frame 1 smoothly, as shown in FIG. 11. When other lens 3 is assembled with the present assembly, the upper edge of the lens 3 is pushed into the lens insertion slot 11 of the frame 1 and the protruding portions 32 of the lens 3 are moved along the guiding ramps 222 of the mounting pins 22 of the movable mounting member 2 to be mounted into the concave part 221. Then the two mounting pins 22 are mounted and positioned in the mounting slot 31 of the lens 3. When the force applied to the movable mounting member 2 is discontinued, each of the two mounting pin 22 is released from the bevel 122 due to its own recovery elasticity and the movable mounting member 2 is turned back and positioned. Thus the lens 3 is further mounted and positioned by the movable mounting member 2.

Compared with the techniques available now, the present invention mainly uses the bevels of the mounting indentation in combination with recovery elasticity of the two mounting pins of the movable mounting member to make the movable mounting member turn back and remain positioned without arrangement of additional elastic members. Not only the whole assembly process is easier and more convenient and no elastic fatigue occurs, the service life of the assembly is also prolonged and the present assembly is more practical for use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An eyeglass lens replacement assembly comprising a frame, a movable mounting member and a lens;
   wherein the frame includes a lens insertion slot arranged at a lower edge of the frame and a mounting indentation which is formed on a middle part of a surface of a rear side of the frame and communicating with the lens insertion slot; the mounting indentation is provided with a limit recess disposed on a top end of the mounting indentation and a bevel formed on each of two sides of a front end of the mounting indentation;
   wherein the movable mounting member is mounted in the mounting indentation of the frame and composed of a limit convex part projecting toward the limit recess of the mounting indentation and two mounting pins corresponding to each other and projecting toward the mounting indentation; the movable mounting member is firmly mounted in the mounting indentation by the limit convex part locked and positioned in the limit recess; a concave part is formed on a middle part of the mounting pin;
   wherein an upper edge of the lens is inserted into the lens insertion slot of the frame; the lens includes a mounting slot and two protruding portions; the mounting slot is formed on the upper edge of the lens and corresponding to the mounting pins of the movable mounting member while the protruding portion is located on each of two sides of an open end of the mounting slot and corresponding to the concave part of the mounting pin.

2. The assembly as claimed in claim 1, wherein a guiding ramp is formed on the mounting pin and corresponding to a lower edge of the concave part.

* * * * *